United States Patent Office 3,427,539
Patented Feb. 11, 1969

3,427,539
ELECTROCHEMICAL INTEGRATOR DEVICE
William C. Mann, Laurel, Md., assignor to Westinghouse Electric Corporation, East Pittsburgh, Pa., a corporation of Pennsylvania
Filed Sept. 30, 1964, Ser. No. 400,475
U.S. Cl. 324—94                                    4 Claims
Int. Cl. G01r 27/24

ABSTRACT OF THE DISCLOSURE

A capillary tube member including first and second electrodes extending into the capillary chamber at either end of the tube and at least a third electrode extending into the chamber intermediate the ends thereof. The capillary chamber includes a quantity of mercury and an electrolyte bubble. By selective application of relative potentials to the electrodes electro-deposition of the mercury takes place whereby the size of the electrolyte bubble may be varied and accurately controlled.

---

This invention in general relates to electrical indicators, and more in particular to an improved electrical current integrator of the electrochemical type.

Electrical integrators are utilized in various systems for indicating and/or storing analog information accumulated over a period of time. One type of integrator comprises a glass capillary tube having a small amount of electrolyte and a large amount of a plating metal such as mercury, in the capillary chamber thereof. First and second electrodes at the end of the capillary tube are connected to a system, an analog quantity of which is to be measured. The mercury is contiguous with the electrodes thereby forming two columns of mercury with the small amount of electrolyte therebetween. A potential difference between the two electrodes causes some of the mercury associated with one electrode to be electro-deposited at the other column of mercury contiguous with the second electrode. As the mercury is electro-deposited there is a movement of the electrolyte, acting in effect as a bubble and the position of the bubble is an indication of the total current flow through the integrator.

The integrators for example are used in various types of logic devices, to store analog information, as elapsed time indicators, differential amplifier balancers, and battery condition indicators.

In order to effect a proper read-out of information from the integrator, it is desired that the size of the electrolyte bubble be extremely small. In systems utilizing a plurality of like integrators, it is desirable that the electrolyte bubbles be exactly the same size, that is, each bubble should contain the same amount of electrolyte. Electrical integrators of the prior art are extremely difficult, and sometimes impossible to manufacture when these two characteristics are required.

It is therefore an object of the present invention to provide an electrical integrator of the tube and electrolytic bubble type wherein the size of the bubble may be accurately controlled.

It is a further object to provide an integrator of the type described wherein the electrolytic bubbles of a plurality of integrators may be of uniform size.

Another object is to provide an integrator of the type described wherein the electrolyte bubble size is determined after assembly of the integrator is completed.

Another object is to provide an integrator of the type described wherein more than one electrolyte bubble may be formed and/or used.

Another object is to provide an integrator of the type described which may be operable to provide a relatively impurity-free mercury surface in contact with the electrolyte bubble.

Briefly, in accordance with the above objects, the broad concept of the invention comprises an electro-chemical device in the form of a tube member having a central chamber containing an electrolyte and a plating material therein. First and second spaced apart electrodes each extend into the chamber and intermediate these two spaced apart electrodes is a third electrode extending into the chamber. By selective energization of the various electrodes, the plating material is electro-deposited until a desired quantity of electrolyte is provided between the material contiguous with two of the electrodes. After the desired quantity of electrolyte between the electrodes has been achieved, two of the three electrodes are then operable to receive signals from an external system, a quantity of which is to be measured.

In another embodiment a plurality of intermediate electrodes is placed intermediate to end electrodes and by selective energization of the electrodes an integrator is produced wherein a desired size electrolyte bubble may be produced between two columns of plating material, the surfaces contiguous with the electrolyte being free from impurities.

The above stated and further objects and advantages of the present invention will become apparent upon reading of the following detailed specification taken in conjunction with the drawings, in which.

Figure 1:
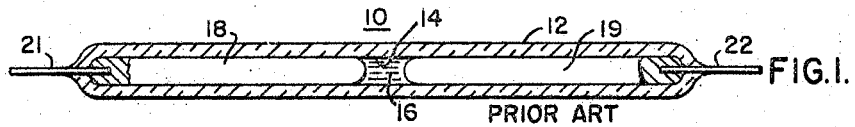
FIGURE 1 illustrates an electrical integrator of the prior art.

Referring now to FIG. 1, there is shown an electrical integrator 10 of the prior art. The integrator includes a capillary tube member 12 having a central capillary chamber 14. The capillary chamber 14 (shown enlarged) has included therein an electrolyte 16 and a plating metal such as a first column of mercury 18 and a second column of mercury 19. Electrodes 21 and 22 contiguous with mercury columns 18 and 19 respectively extend through the capillary tube member 12 and have applied thereto a signal current, the integral of which is to be measured. In the manufacture of such electrical integrators, the electrolyte is a fixed quantity the accurate amount of which is difficult and sometimes impossible to control. With a positive potential applied to electrode 21 and a negative potential applied to electrode 22, mercury ions from the mercury column 18 travel toward the negative electrode 22 through the electrolyte 16 effecting the electro-deposition of mercury onto the mercury column 19 from the mercury column 18. As the mercury is electro-deposited on the column 19 the electrolyte is displaced towards the electrode 21. When the potentials are removed from the electrodes 21 and 22 the electrolyte bubble 16 will have moved a certain distance from its initial position. The distance moved is an indication of the duration of the current applied to the terminals 21 and 22. More specifically the value of the integral of the current is proportional to the distance moved. One way of determining this distance is by a measurement of the change in capacitance of one of the mercury columns. Another method in determining the distance moved is by an optical read-out and to this end the reference should now be made to FIG. 2.

Figure 2:
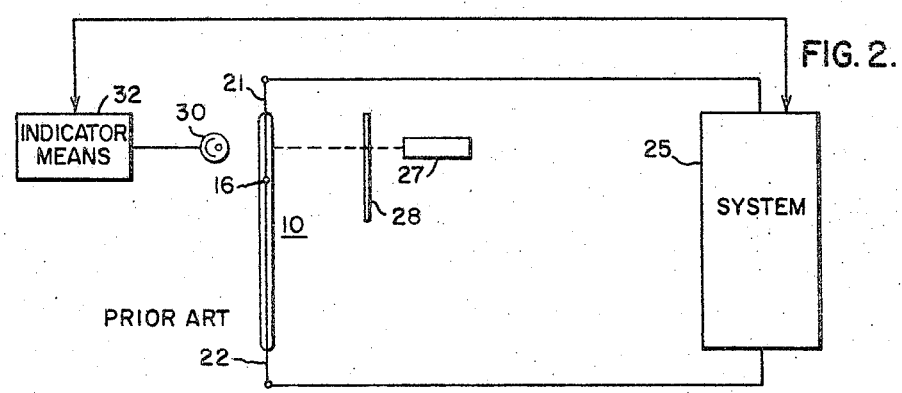
FIG. 2 illustrates, in block diagram form, one type of overall system in which the integrator may be used.

FIG. 2 illustrates the integrator 10 connected to some type of system 25 which provides the positive and negative potential to electrodes 21 and 22 respectively. A light projector 27 projects a beam of light through a suitable mask 28, the light striking one of the mercury columns of the integrator 10. With the position of the electrolyte bubble 16 as shown, a photoelectric pick-up 30 receives no light signal and provides no signal to the indicator means 32. After a certain time duration the electrolyte bubble will have reached a position to allow transmission of the light from projector 27 so that an indication may be obtained. Many other types of optical systems may be utilized such as having a plurality of photoelectric pick-up devices arranged along the length of the integrator 10 so that as the electrolyte bubble moves toward electrode 21; selective energization of the arranged photoelectric cells would provide some sort of indicating means with information relative to the electrolyte bubble travel.

Figure 3A:
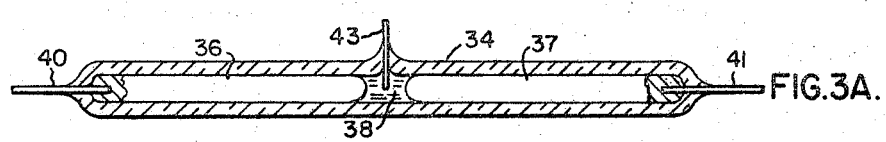
FIG. 3A illustrates a preferred embodiment of the present invention.

FIG. 3A illustrates a preferred embodiment of the present invention. The integrator of FIG. 3A includes a tube member 34 in the form of capillary tube which may be made of glass and which includes therein a plating material in the form of mercury columns 36 and 37 occupying a major portion of the central capillary chamber of the tube 34, and an electrolyte 38. Two spaced apart wire electrodes 40 and 41 extend into the capillary chamber at the ends of the capillary tube member 34 and are fused to the glass. Intermediate the spaced apart first electrode 40 and second electrode 41 is a third electrode 43 which also extends into the capillary chamber of the capillary tube 34. The addition of the electrode 43 allows the integrator of the present invention to be manufactured without regard for exacting quantities of electrolyte since an electrolyte bubble of controlled size may be generated by selective energization of the various electrodes such as by an arrangement shown in FIG. 4.

Figure 3B:
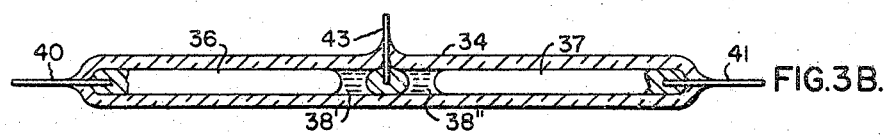
FIGS. 3B to 3D illustrate the operation of the present invention.
Figure 3C:
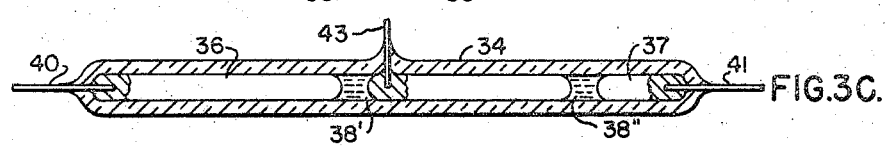
Figure 3D:
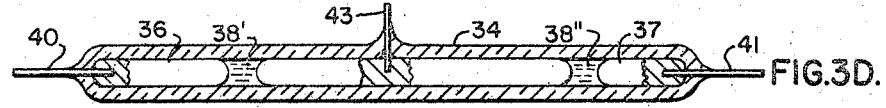
Figure 4:
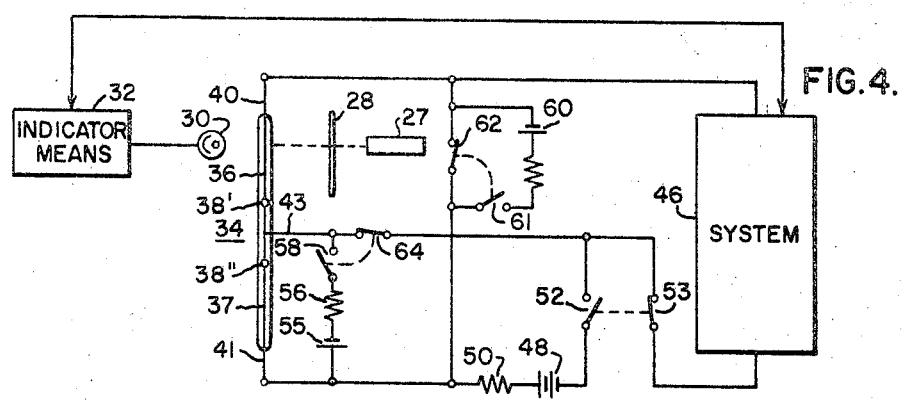
FIG. 4 illustrates an overall system in which the present invention may be utilized.

In FIG. 4 an electric signal from system 46 is applied to the first electrode 40 and the third electrode 43 of the integrator 34. Battery 48 has its positive electrode connected to both electrodes 40 and 41 through resistor 50 and its negative connected through switch 52 to the third electrode 43. Switch 52 may be interconnected with switch 53 so that when the switch 52 is closed, switch 53 will be open to establish initial conditions in the absence of a signal from system 46. Assuming that the integrator is initially as is shown in FIG. 3A, the closing of the switch 52 will cause the mercury from both columns 36 and 37 to be electro-deposited upon the electrode 43. This action causes two electrolyte bubbles to form, namely 38' and 38". The longer the battery potential 48 is applied, the greater will be the electrodeposition of mercury upon electrode 43 thus causing a greater separation of the electrolyte bubbles 38' and 38". In order to initially control the relative sizes of the electrolyte bubbles 38' and 38", the length of the mercury columns 36 and 37 shown in FIG. 3A may be relatively changed by application of potential from battery 60 and by closing switch 61 and opening switch 62. This operation in effect causes the mercury column 36 to increase in length. This may be continued until the mercury column 36 just touches the electrode 43 at which time the polarity of battery 60 may be reversed until the end of mercury column 36 is at a predetermined and accurately controllable initial distance from the electrode 43. This distance may be controlled precisely by electrical or optical measurement. When the mercury column 36 is at its initially set distance from electrode 43 the aforementioned process utilizing battery 48 may be commenced to thereby obtain an accurately controlled electrolyte bubble 38' as shown in FIG. 3B. When the electrolyte bubbles 38' and 38" have moved a sufficient distance away from electrode 43, switch 52 may be opened and switch 58 may be closed to apply the positive potential of battery 55 to the third electrode 43 and the negative potential thereof to second electrode 41. Closing of the switch 58 can be coupled to open switch 64 to disconnect the system 46. Closing of switch 58 causes electro-deposition of mercury from column 37 onto the mercury electro-deposited at electrode 43 thereby causing the relative movement of electrolyte bubble 38" away from electrode 43 and toward the electrode 41, the situation being illustrated in FIG. 3C. When the electrolyte bubble 38" has been moved away from the vicinity of electrode 43 a sufficient amount, switch 58 may be opened thereby having the system 46 connected to electrodes 40 and 43 to cause selective electro-deposition of mercury associated with these electrodes in order to relatively move the electrolyte bubble 38' so that a desired signal from the system 46 may be measured and stored as heretofore explained.

Obviously, numerous other arrangements may be utilized other than that illustrated in FIG. 4. Manipulation of the electrolyte bubbles may be obtained with various other battery energization configurations. Additionally, systems utilizing the present invention may be formed wherein the third electrode 43 is a common electrode to two systems, the signal from one being applied to electrode 40 and a signal from the other being applied to electrode 41, with the travel of electrolyte bubble 38' being indicative of the signal from the first system and the travel of electrolyte bubble 38" being indicative of the signal from the second system. Although one type of optical read-out system including light projector 27, light mask 28, photoelectric pick-up means 30 and indicator 32, are shown, other schemes and systems to determine the travel of the electrolyte bubble may be provided as is obvious to one skilled in the art.

Figure 5A:
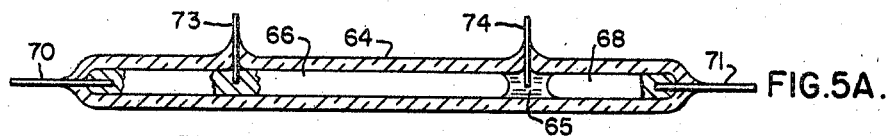
FIG. 5A illustrates another embodiment of the present invention.
Figure 5B:
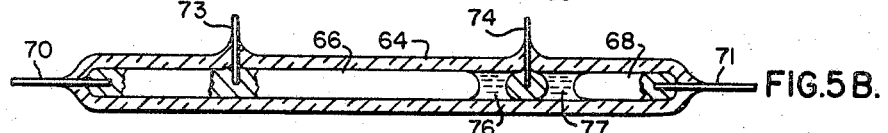
FIGS. 5B through 5F illustrate the operation of the integrator of FIG. 5A.
Figure 5C:
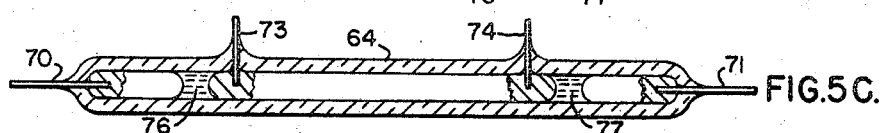
Figure 5D:
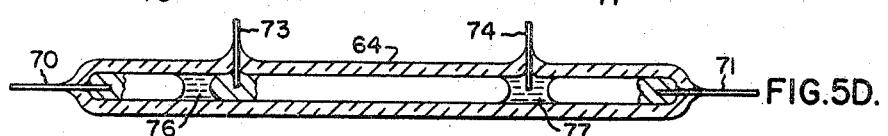
Figure 5E:
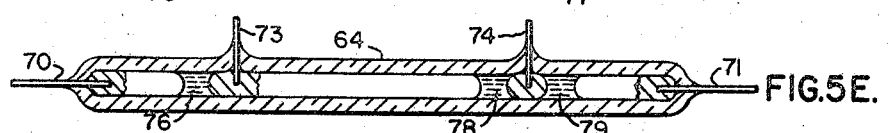
Figure 5F:
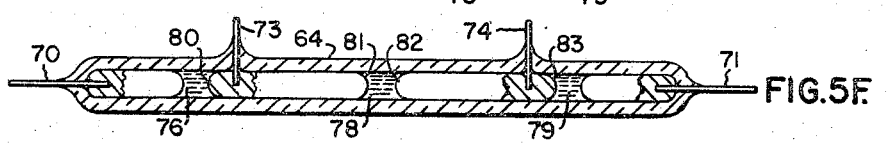

FIG. 5A illustrates another embodiment of the present invention. The integrator of FIG. 5A includes a capillary tube member 64 having in the capillary chamber therein an electrolyte 65 and mercury columns 66 and 68. Extending into the capillary chamber at the end portions of the capillary tube 64 are a first electrode 70 and a second electrode 71. Intermediate the first and second electrodes are a plurality of electrodes of which two, 73 and 74, are shown. By selective energization of the various electrodes, an electrolyte bubble may be obtained intermediate two columns of mercury, the surface contiguous with the electrolyte being free of impurities. By applying a negative potential to electrode 74 and positive potential to electrodes 70 and 71, mercury is electro-deposited upon electrode 74 to thereby form a first accurately controlled electrolyte bubble 76 and a second electrolyte bubble 77 as was demonstrated with respect to FIGS. 3A and 3B. By applying negative potential to electrode 70 and positive potential to electrode 74, the electrolyte bubble 76 may be made to migrate past electrode 73 and toward electrode 70, resulting in the situation shown in FIG. 5C. A negative potential applied to electrode 71 and a positive potential applied to electrode 73 will bring the electrolyte bubble 77 to a position such as shown in FIG. 5D. By repeating the procedure relative to FIGS. 5A and 5B, an accurately controlled electrolyte bubble 78 and another electrolyte bubble 79 may be formed as shown in FIG. 5E, and by connecting electrodes 73 and 74 to an external system, a signal therefrom may be recorded and indicated by the relative movement of the electrolyte bubble 78 as heretofore explained. This latter situation is illustrated in FIG. 5F. It may be seen that the resulting integrator of FIG. 5F includes three electrolyte bubbles one of which is used as an indicating means. In FIG. 5F the surfaces labeled 80-83 were not present during the manufacture of the integrator; they were formed as a result of selective energization of the various electrodes. The embodiment of the invention shown in FIG. 5A therefore insures freedom from impurities which might be introduced during assembly or as a result of deterioration with age.

By selectively connecting the electrodes to various points in a system, or to various systems, relative signals from these points or systems may be respectively indicated by movement of all three electrolyte bubbles 76, 78 and 79.

Although the present invention has been described with a certain degree of particularity, it is to be understood that the present disclosure has been made by way of example and that modifications and variations of the present invention are made possible in the light of the above teachings.

What is claimed is:

1. An electrochemical integrator comprising:
   a capillary tube member closed at both ends;
   a first electrode extending into said capillary tube at one end thereof;
   a second electrode extending into said capillary tube at the other end thereof;
   a third electrode extending into said capillary tube at a point intermediate said first and second electrodes;
   said tube containing an electrolyte bubble and mercury; and
   circuit means for applying selected relative potentials to said electrodes for selective electro-deposition of said mercury to form two electrolyte bubbles, one between said third and first electrode and the other between said third and second electrode.

2. An electrical integrator comprising:
   a capillary tube member;
   first and second spaced apart electrodes extending into said capillary tube;
   a plurality of other electrodes intermediate said first and second electrodes and extending into said capillary tube;
   said capillary tube member containing an electrolyte bubble and a material adapted to be plated onto selected ones of said electrodes upon selective application of electric potential to said electrodes; and
   circuit means for applying selected relative potentials to said electrodes for selective plating of said material to form at least three electrolyte bubbles, at least one of said three electrolyte bubbles being positioned between two electrodes of said plurality of other electrodes.

3. An electrical integrator comprising:
   a transparent capillary tube member having a central capillary chamber and a surrounding wall;
   a first wire electrode fused to said wall and extending into said chamber at one end thereof;
   a second wire electrode fused to said wall and extending into said chamber at the other end thereof;
   at least a third electrode fused to said wall and extending into said chamber intermediate said first and second wire electrodes;
   said chamber containing a major portion of mercury and another portion forming an electrolyte bubble; and
   circuit means for applying selected relative potentials to said electrodes for selective electro-deposition of said mercury to form two electrolyte bubbles, one between said third and first electrode and the other between said third and second electrode.

4. An electrical integrator comprising:
   a capillary tube member having a central capillary chamber;
   said chamber having therein an electrolyte and mercury;
   first, second and third electrodes extending into said chamber; and
   means for applying potential of selected polarities to said electrodes to electro-deposit said mercury onto said third electrode to establish a desired quantity of electrolyte between said first and third electrodes and between said second and third electrodes.

References Cited

UNITED STATES PATENTS

| | | | |
|---|---|---|---|
| 2,648,630 | 8/1953 | Basilewsky | 204—219 |
| 3,045,178 | 7/1962 | Corrsin | 324—94 |
| 3,172,083 | 3/1965 | Constantine | 340—173 |
| 3,249,724 | 5/1966 | Hurvitz | 324—93 |

TERRELL W. FEARS, *Primary Examiner.*

U.S. Cl. X.R.

204—219, 250